Figure 1:
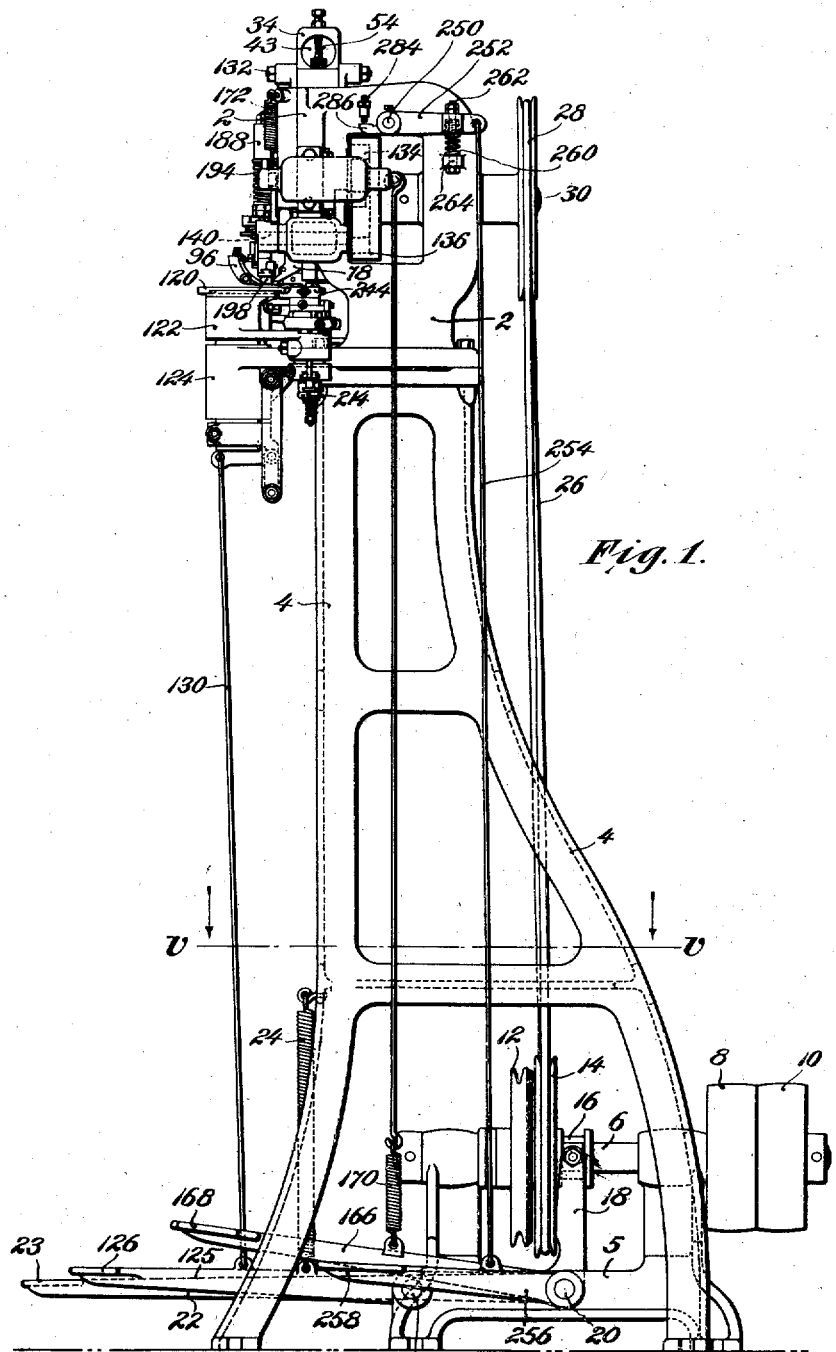

F. E. BERTRAND.
SOLE CHANNELING MACHINE.
APPLICATION FILED APR. 30, 1908.

1,023,801.

Patented Apr. 23, 1912.
7 SHEETS—SHEET 3.

Witnesses:

Inventor:
Frederic E. Bertrand

F. E. BERTRAND.
SOLE CHANNELING MACHINE.
APPLICATION FILED APR. 30, 1908.

1,023,801.

Patented Apr. 23, 1912.

7 SHEETS—SHEET 4.

Witnesses:
E. C. Wurdeman
Warren G. Ogden

Inventor:
Frederic E. Bertrand
by his Attorneys
Phillips Van Everen & Fish

F. E. BERTRAND.
SOLE CHANNELING MACHINE.
APPLICATION FILED APR. 30, 1908.
1,023,801.
Patented Apr. 23, 1912.
7 SHEETS—SHEET 5.
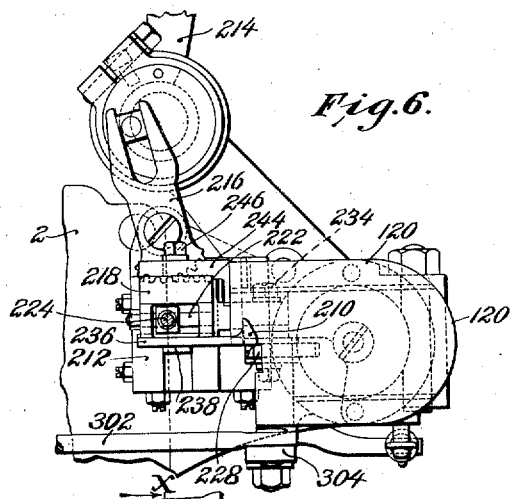
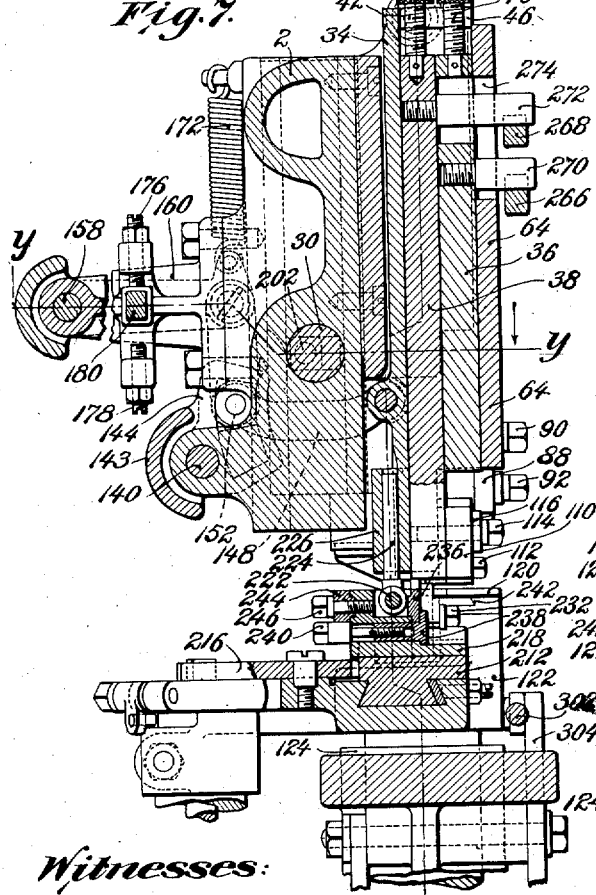
Witnesses:
E. C. Wurdeman
Warren G. Ogden
Inventor:
Frederic E. Bertrand
by his Attorneys
Phillips Van Everen & Fish F. E. BERTRAND.
SOLE CHANNELING MACHINE.
APPLICATION FILED APR. 30, 1908.
1,023,801.
Patented Apr. 23, 1912.
7 SHEETS—SHEET 6.
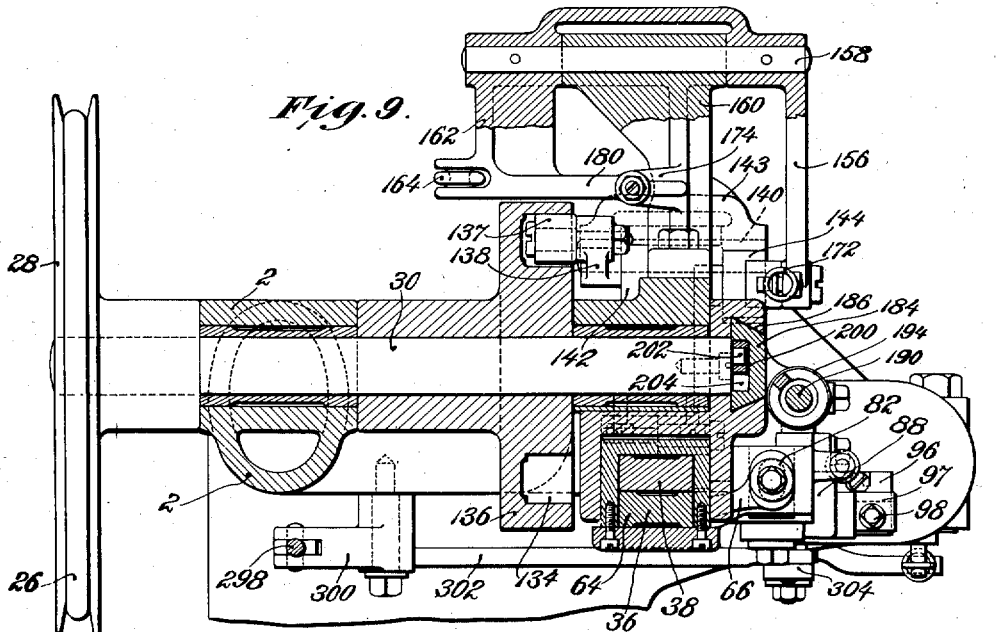
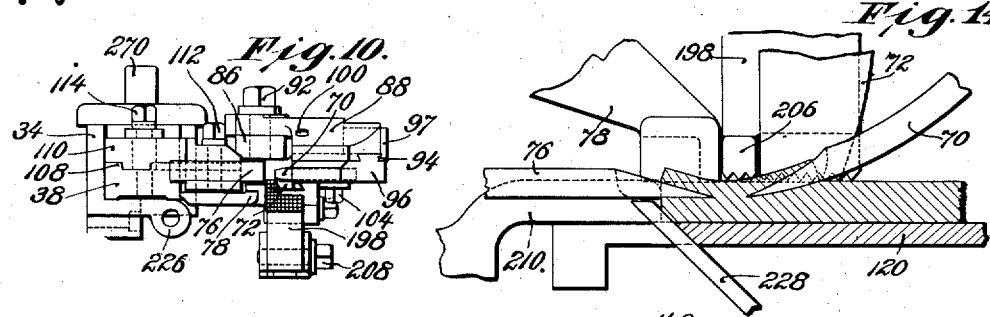
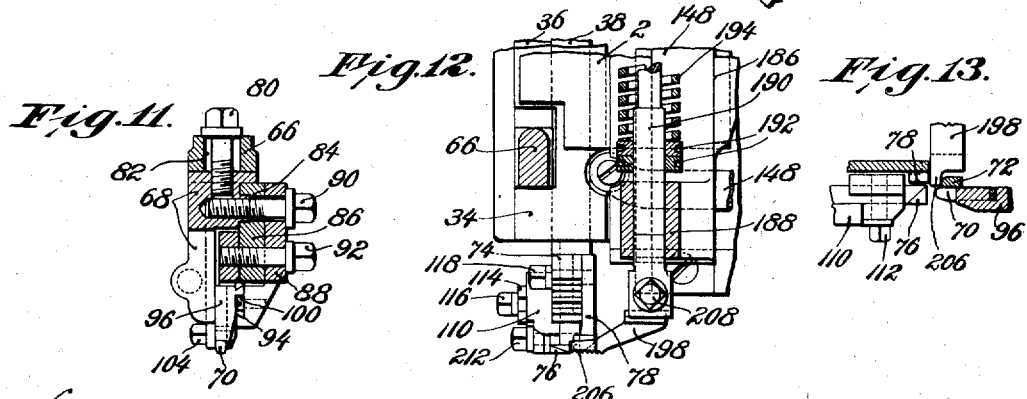
Witnesses:
E. C. Wurdeman
Warren G. Ogden
Inventor:
Frederic E. Bertrand
by his Attorneys
Phillips Van Everen & Fish F. E. BERTRAND.
SOLE CHANNELING MACHINE.
APPLICATION FILED APR. 30, 1908.
1,023,801.
Patented Apr. 23, 1912.
7 SHEETS—SHEET 7.
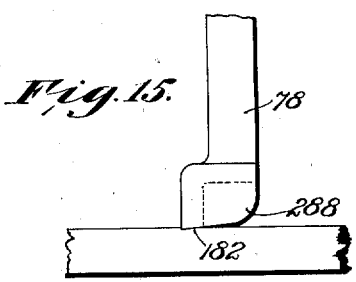
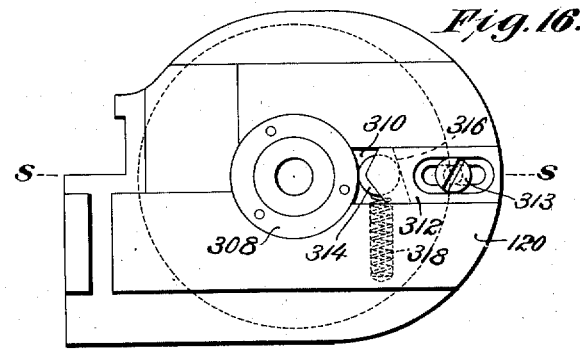
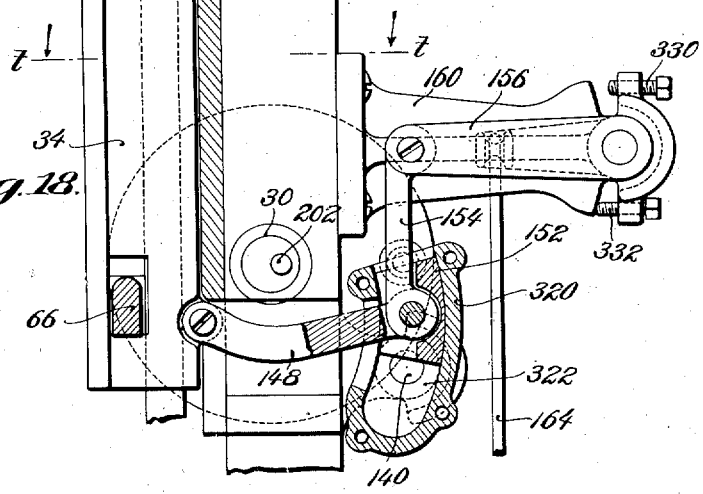
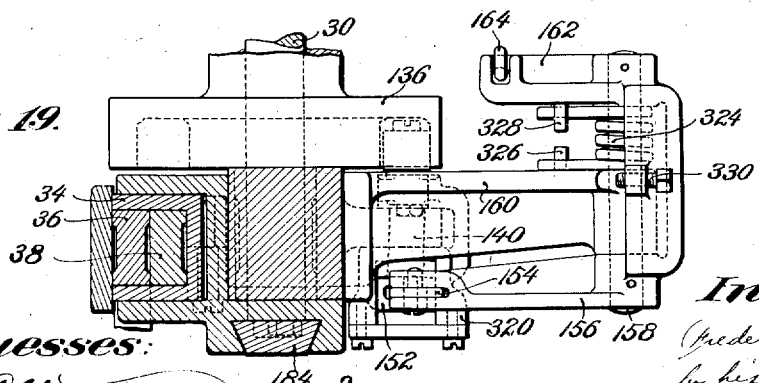
Witnesses:
E. C. Murdeman
Warren G. Ogden
Inventor:
Frederic E. Bertrand
by his Attorneys
Phillips Van Everen & Fish

UNITED STATES PATENT OFFICE.

FREDERIC E. BERTRAND, OF SWAMPSCOTT, MASSACHUSETTS, ASSIGNOR TO UNITED SHOE MACHINERY COMPANY, OF PATERSON, NEW JERSEY, A CORPORATION OF NEW JERSEY.

SOLE-CHANNELING MACHINE.

1,023,801.  Specification of Letters Patent.  Patented Apr. 23, 1912.

Application filed April 30, 1908. Serial No. 430,118.

*To all whom it may concern:*

Be it known that I, FREDERIC E. BERTRAND, a citizen of the United States, residing at Swampscott, in the county of Essex and State of Massachusetts, have invented certain new and useful Improvements in Sole-Channeling Machines; and I do hereby declare the following to be a full, clear, and exact description of the invention, such as will enable others skilled in the art to which it appertains to make and use the same.

This invention relates to machines for operating on the soles of boots and shoes known in the art, broadly, as "channeling machines," and more particularly to such machines for operating upon welt insoles or soles for turned shoes.

In the manufacture of insoles for use in welted boots and shoes, and of soles for turned shoes, it is customary to treat them by channeling, shouldering, slitting, beveling, or otherwise to prepare them for the reception of the stitches, and the general purpose of the invention is to produce an improved machine for preparing soles in this manner.

In this class of machines the sole is generally fed through the machine automatically but must be guided by the operator in order to maintain the cutting devices in proper relation to the sole edge, and in order to obtain this desired relation great care must be exercised particularly at the toe where the curve is sharp, and often, as in "razor toe" work, forms an acute angle. It is obvious to those skilled in the art, that, for the best work, it is impracticable to feed the sole at the same speed, when cutting around the sharp curve of the toe, as can be maintained along the more nearly straight fore part of the sole. Also, in some classes of work, it is convenient to bring the work feeding devices to rest after the fore part on one side has been operated upon, while the sole is being swung about the edge gage to properly present the fore part on the other side to the cutting instrumentalities.

One object of this invention is to provide means for feeding the work, which normally operates at as high a speed as is consistent with good work when treating the fore part of the sole, constructed and arranged to permit a sufficient variation in its speed of operation at the will of the operator to enable the toe of the sole to be properly prepared for stitching. In connection with the speed varying means there is preferably also provided means for automatically reëstablishing the normal work feeding speed when the position of the work is such that this speed may again be utilized. Preferably the work feeding is by a step-by-step movement, and in this preferred form of the machine the invention contemplates the provision of a reciprocating work-engaging feeding foot, an actuator having a constant throw and an adjustable connection between the actuator and the feeding foot for utilizing the whole or a portion only of the throw of the actuator, or for nullifying the throw of the actuator entirely. With this mechanism there may be provided adjusting means for predetermining both the fast and slow speeds of operation. In operating this type of machine it has been customary heretofore to feed the sole by means of a device acting on the between substance having a toothed work-engaging portion. Such a form of work feed is disadvantageous, as, in order to obtain a good hold on the work, the teeth for engaging the work must be of such length that the between substance is unduly mutilated and thus seriously weakened.

Another object of this invention is to provide means to overcome these disadvantages by the provision of work-feeding devices adapted to perform their proper function by acting on the surface of the sole in such manner that the strength of the between substance is unimpaired. In the machine selected for illustrative purposes the incisions in the sole are formed by a reciprocating cutter or cutters, the usual presser gages coöperating therewith are utilized to feed the sole during movement in one direction, and a work retainer, acting on the face of the sole by pressure only, holds the sole stationary during the return movement. In this preferred form of the invention the cutting of the sole occurs on the return, or backward, stroke of the cutting and work-feeding instrumentalities and while it is held from movement by the work retainer.

As is usual, there is provided an edge gage movable in and out relatively to the work support, or transversely of the line of feed, to permit the variation in distance of the channel from the sole edge for a purpose well known to those skilled in the art. When operating the sole cutting instrumentalities in the manner heretofore described as preferable, it is desirable that the edge gage be constantly maintained in engagement with the sole at a point opposite the cutter, or cutters, so that a bearing point for the sole is provided which is always in constant relation to the cutting devices which form the fulcrum of the turning movement, thus insuring a uniform edge. To gain this end the edge gage is preferably connected to the means for reciprocating the cutting and work feeding instrumentalities whereby the desired constant relation therebetween is maintained throughout the operation of the machine.

It is desirable in welt work to bevel the unchanneled surface of the sole for reasons well known to those skilled in the art, and to avoid the necessity of a separate operation to gain this end, there is preferably provided in the machine of this invention a beveling or chamfer knife. Means is provided to maintain the chamfer knife and edge gage in constant relation during the in-and-out movement of the edge gage to secure a uniform chamfer on different widths of feather. In order to constantly provide a support for the margin of the sole, when varying the width of feather by a movement of the edge gage, means is also provided for moving the work support with the gage in its in-and-out movement.

In the machine of this invention, when operating on a welt insole, a channel and an edge slitting knife are used, while when operating on a turn sole a shoulder knife is substituted for the slitting knife. In welt work it is only necessary for the incisions to extend to about the forward edge of the heel seat, and it is therefore desirable to stop the cutting at this point, thus avoiding a weakening of the heel seat by allowing the knives to "run out" at the rear of the heel. In turn work the channel is continuous around the heel seat but a feather edge at this portion of the sole is undesirable. In razor toe work for both welts and turns it is desirable to raise the channel knife at the toe while the edge knife is being run off and on again.

Another object of this invention is to provide means for manipulating the knives at will for the purpose just above described. In the illustrative embodiment of the invention a lifter is provided which may be adjusted for raising either the channel or edge knife. Preferably, also, a mechanism is connected to the work support operating mechanism whereby when the work support is lowered for removal of the sole both of the knives are raised, the work retaining foot acting in this connection as a stripping device for removing the sole from the knives.

In addition to the objects of the invention above referred to, this invention also consists in certain constructions and arrangements of parts as fully set forth hereinafter, the advantages of which will be obvious to those skilled in the art. To the accomplishment of these objects the invention comprises the features and combinations of parts hereinafter described and particularly pointed out in the appended claims.

The various features of the invention will be best understood from a description of one embodiment thereof, such, for instance, as illustrated in the accompanying drawings, in which:—

Figure 2:
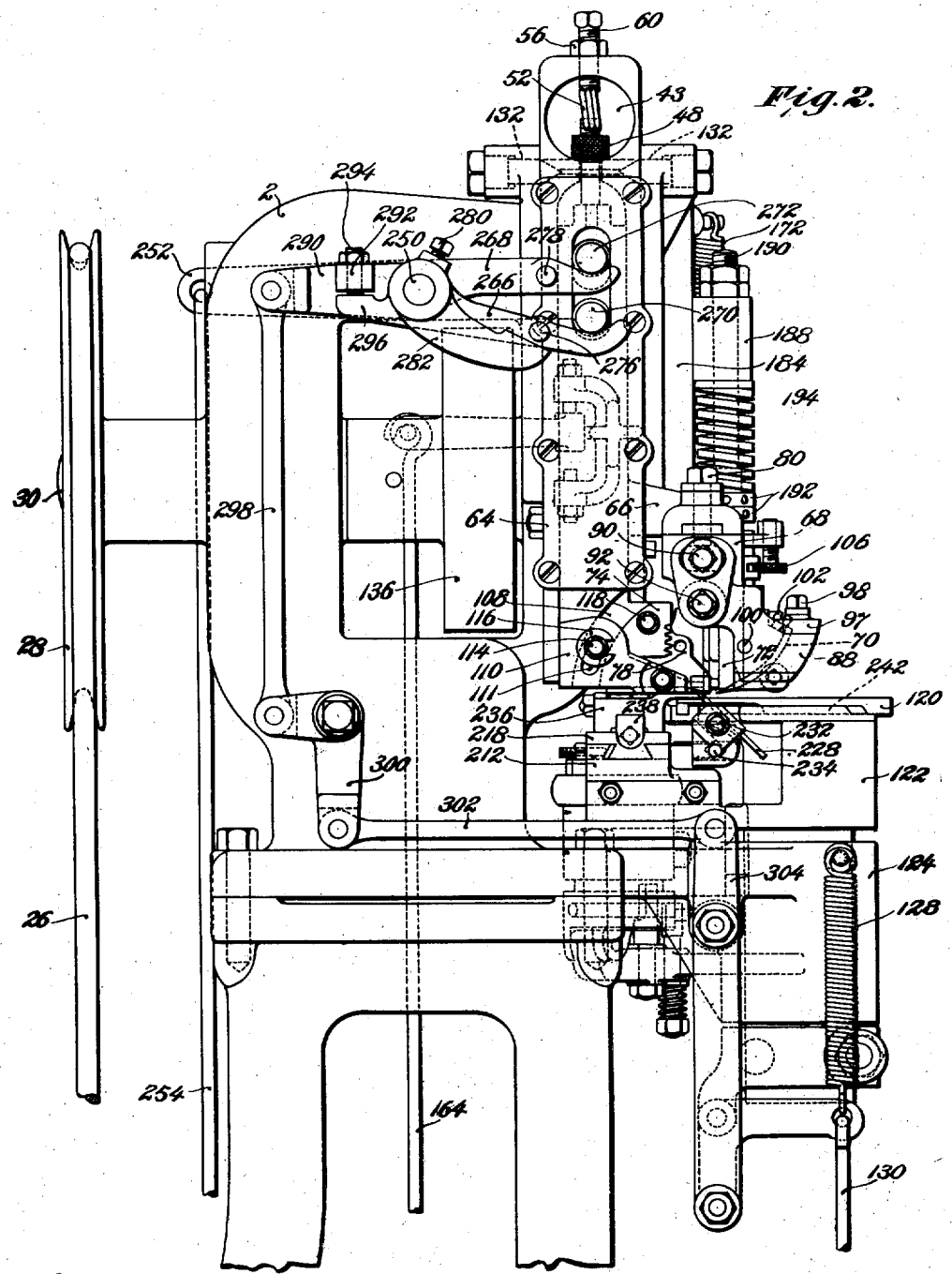
Figure 3:
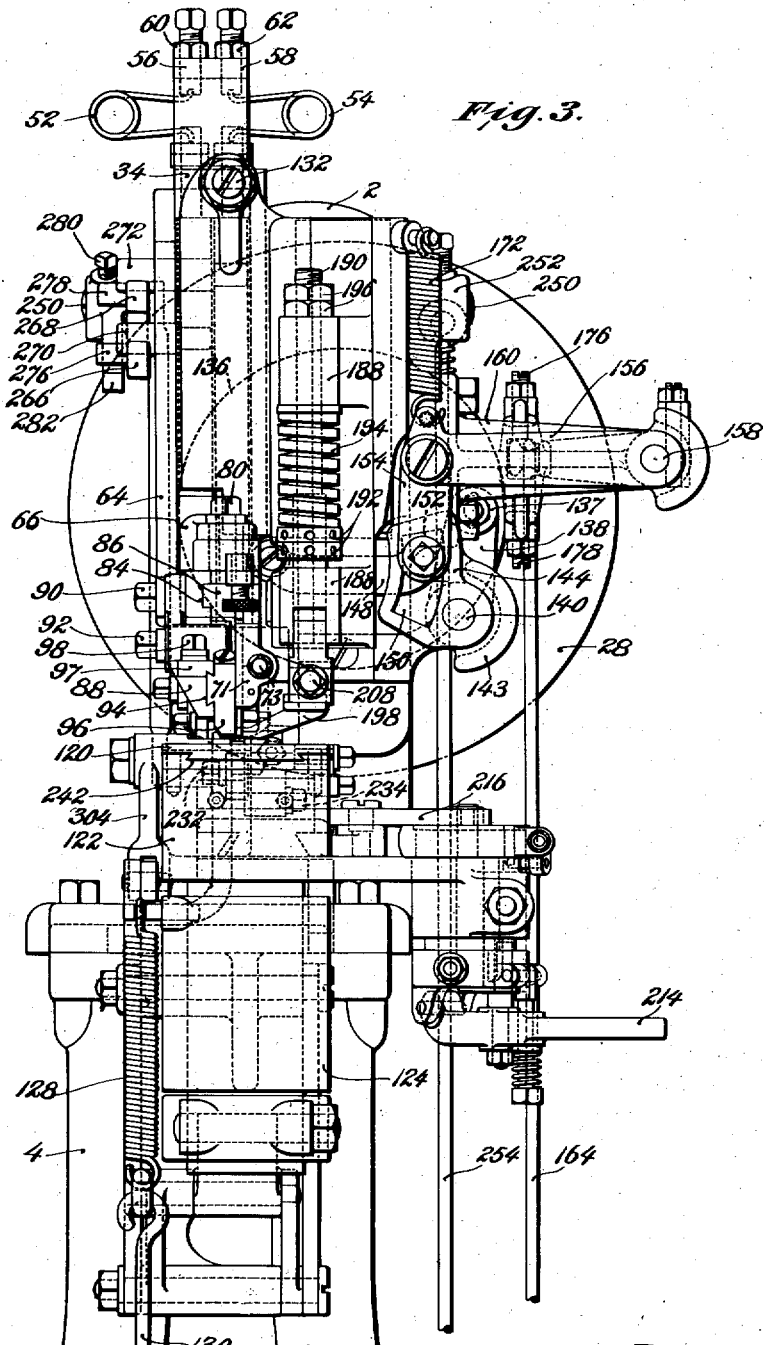
Figure 4:
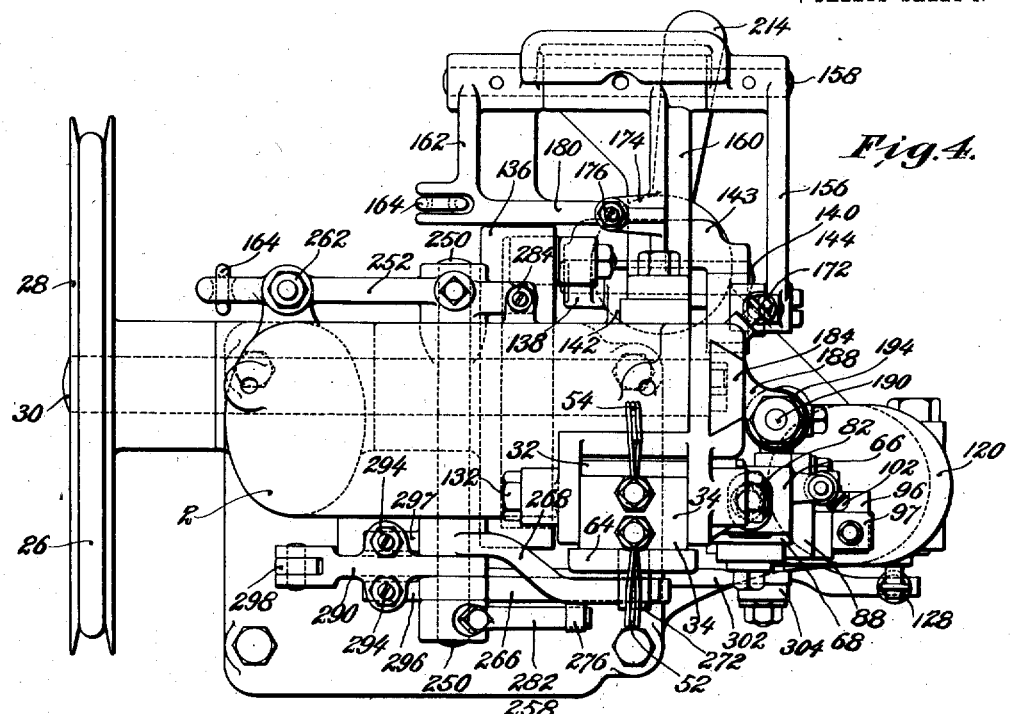
Figure 5:
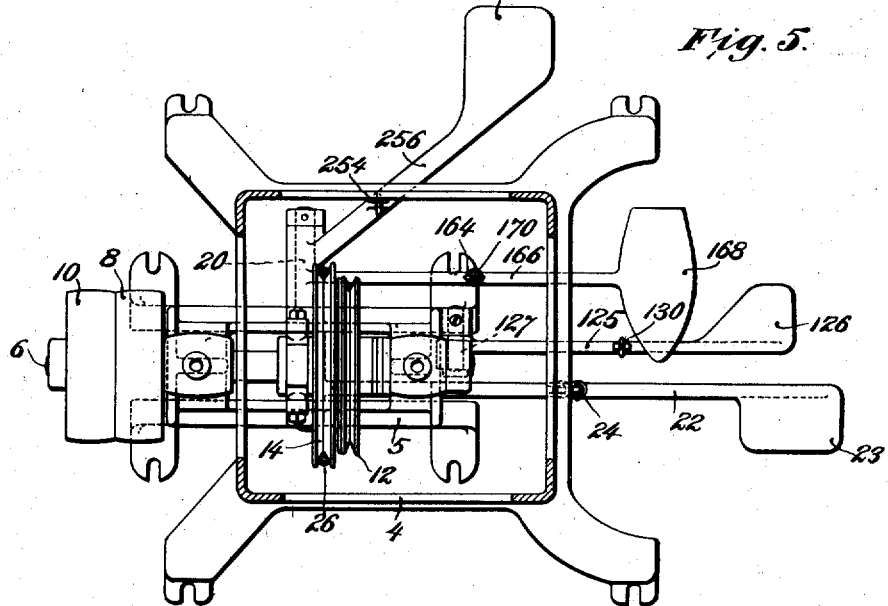

Figure 1 is a front elevation of the machine, including the base, on which the machine head is mounted, the operating treadles and the driving gear; Fig. 2 is a rear elevation of the machine head; Fig. 3 is a left hand side elevation of the parts shown in Fig. 2; Fig. 4 is a plan; Fig. 5 is a transverse section in plan on the line $v$—$v$, Fig. 1; Fig. 6 is a detail in plan of the work support and its associated parts; Fig. 7 is a transverse section in elevation on the line $w$—$w$, Fig. 8; Fig. 8 is a longitudinal section in elevation on the line $x$—$x$, Fig. 7; Fig. 9 is a transverse section in plan on the line $y$—$y$, Fig. 7; Fig. 10 is a detail showing an under-side view of the cutters, presser gages, work retainer and their holders; Fig. 11 is a sectional elevation in detail on the line $z$—$z$, Fig. 8, with the presser gage removed; Fig. 12 is a transverse section in elevation through the work retainer; Fig. 13 is a detail plan partly in section showing the relative location of the cutters, presser gages, and work retainer; Fig. 14 is an enlarged detail in elevation showing diagrammatically, the relative working positions of the cutters, work support, edge gage, presser gages, and work retainer; Fig. 15 is a detail of the edge knife presser gage; Fig. 16 is an under-side view of an amplification of the work support; Fig. 17 is a vertical section on line $s$—$s$, Fig. 16; Fig. 18 is a modification in elevation and partly in section, of the work feed adjusting mechanism, shown in Fig. 3; and Fig. 19 is a transverse section in plan on the line $t$—$t$, Fig. 18.

In the embodiment of the invention selected for illustrative purposes, and referring first more particularly to Figs. 1 and 5, 2 is a frame for the head of the machine which carries the operative parts, and 4 is a base or stand to which said head is suitably secured. At the base of the stand 4 there is an auxiliary stand 5 in which is suitably journaled a driving shaft 6 having upon it fast and loose pulleys 8 and 10. This driving shaft also carries a friction disk 12 keyed to the shaft, and a second friction disk 14 which is loosely mounted thereon. The friction disk 14 is provided with a collared hub 16 coöperating with which is a yoke 18 on one end of a vertical lever arm pivotally mounted on a stud 20 in the stand 5. To the arm carrying the yoke 18 there is connected a lever 22 provided with a foot treadle 23 at the left side of the machine, and this lever is normally maintained raised by means of a spring 24 suitably connected to the lever and to the stand 4. This position of the lever 22 normally maintains the friction disks 12 and 14, which form a friction clutch, out of contact with each other. The friction disk 14 is in the form of a sheave and carries a rope belt 26, which at its upper end rides on a second sheave 28 (Fig. 1) fast on the main shaft 30 of the head 2.

If the belt from the driving shaft 6 to the main source of power is on the fast pulley 8, the driving shaft 6 will be continuously rotated, but with the lever 22 in its normal position as described, the main shaft 30 will be at rest. By depressing the treadle 23 the friction clutch 12—14 is thrown in and rotation of the main shaft 30 is started, which rotation will continue until the treadle 23 is released.

Referring now more particularly to Figs. 4, and 7 to 9 the frame 2 of the head is provided at the rear with a recess or guideway 32 (Fig. 8) within which is hung a carrier 34 for the channel and edge cutting knives and their associated parts. The carrier 34 is a rectangular shaped hollow bar within which are mounted a channel knife slide 36, and an edge knife slide 38. These slides are vertically movable and are supported within the carrier 34 by means of screws 40 and 42 passing through a slot 44 between transversely arranged ribs 46 of the carrier 34, and are adjustably held from downward movement by means of check nuts 48 and 50 on the screws 40 and 42 respectively, which rest in an eye 43 (Fig. 8) in the upper portion of the carrier and bear upon the upper surface of the ribs 46. They are, however, allowed a yielding upward movement by mounting coiled springs 52 and 54 (Fig. 3) in the eye 43, the ends of the springs bearing respectively upon the heads of the screws 40 and 42 and the heads of similar screws 56 and 58 which pass through the top of the carrier 34 and are adjustably held in place by check nuts 60 and 62. With this arrangement all of the adjusting nuts are easy of access and may be easily manipulated when required. The slides 36 and 38 are held within the carrier 34 by means of a cover plate 64 (Fig. 7).

Referring now to Figs. 2, 9 and 11, the channel knife slide 36 is provided with a bracket 66 projecting outwardly from its lower end, and to this bracket is secured the channel knife carrier 68. Supported in this carrier 68 is a channel knife 70 and a channel knife presser gage 72. The edge knife slide 38 also projects outwardly at its lower end, forming a bracket 74 for supporting an edge knife 76 and an edge knife presser gage 78. The channel knife carrier 68 is secured to the bracket 66 by means of a collar screw 80 (Fig. 8) which passes through a transversely arranged slot 82 in the bracket 66. This connection permits an adjustment of the channel knife relatively to the edge knife transversely for varying styles of toe for a purpose well known to those skilled in the art. The carrier 68 is also provided with a guideway 84 (Figs. 3 and 11) on which is mounted a bracket 86 for supporting the channel knife block holder 88. The bracket 86 is held upon the guide 84 by means of a collar screw 90 passing through slots in both the bracket 86 and the knife block holder 88. The knife block holder 88 is pivotally mounted upon a collar screw 92 (Figs. 2, 9 and 11) which passes through the bracket 86 for the knife block holder 88. The channel knife block holder 88 is provided with a guideway 94 which supports a channel knife block 96, said block being held in place on its guide by means of a lock plate 97 and a collar screw 98 (Figs. 2, 9 and 10). The guide 94 is provided with a pin 100 (Fig. 11) and the channel knife block 96 is provided with a shoulder for engaging said pin and limiting the inward position of the knife block upon the knife block carrier. The channel knife block 96 is provided with a groove for holding the channel knife 70, this groove in the present instance being curved on an arc having the pivot screw 92 as a center, although this is not essential. A set screw 102 (Fig. 8) acts as a shoulder against which the rear end of the channel knife 70 abuts, and the knife is held in its groove by an overlapping collar screw 104. A guideway at the rear of the channel knife carrier 68 sustains the channel knife presser gage 72, this gage being held in place, and close beside the channel knife (Fig. 13), by a cap plate 71 and a collar screw 73 (Figs. 3 and 8). The gage is adjustable vertically in its guideway as by means of a thumb screw 106 mounted in the usual manner.

The end of the edge knife bracket 74 is provided with a curved guideway 108 in which is mounted an edge knife block 110 (Fig. 2). The edge knife is held in a suitably formed groove in this block by means of a collar screw 112, and the block itself is held in the guideway 108 by means of a collar screw 114, passing through a slot 111 in the block 110, and a horseshoe washer 116. The bracket 74 is also provided with a vertical guideway in which is suitably mounted the edge presser gage 78, arranged close beside the edge knife 76 (Fig. 13), it being held in any position of vertical adjustment by means of a collar screw 118 (Fig. 2).

With the construction and mounting of the edge and channel knives just described, it is seen that by means of the adjustable connection 80—82 the channel knife may be positioned transversely relatively to the edge knife for cutting any style of toe. The channel knife also may be swung about the collar screw 92 as a pivot, the slot in the channel knife block holder about the collar screw 90 being properly curved for this purpose, and the channel knife thereby placed at a greater or less angle to the surface of the sole to be channeled. Thus any obliquity of channel cut desired may be obtained, either steep or shallow. When the channel knife is angularly adjusted so that it is farthest to the right, in Fig. 2, a very steep channel will be obtained. When farthest to the left in said figure, a very shallow channel will be obtained, and any adjustment between these two points will produce an intermediate obliquity of channel cut. It is obvious that in order to maintain the between substance of the same thickness while the obliquity of the channel cut is being altered by an angular adjustment of the channel knife, the knife should be adjusted toward and from the relatively stationary edge knife. This adjustment is obtained by a movement of the channel knife block holder bracket 86 upon the guide 84 which carries with it the channel knife block holder and the channel knife. The curved guideway 108 in which the edge knife block 110 is mounted, is struck from a center at the cutting edge of the edge knife 76 and therefore the edge knife may be adjusted for a greater or less thickness of the lip, or, in turn work, for a greater or less thickness of feather edge throughout the whole range desired, without affecting the position of the inner edge of the cut, by a mere adjustment of the guideway 108. Both the channel knife block 96 and the edge knife block 110 can be removed from their holders for sharpening the knives without disturbing the adjustment of the knives themselves in their blocks, by simply loosening the collar screws 98 and 114. In the case of the channel knife its previous inward position is obtained by forcing the block 96 back into its guideway 94 until the shoulder thereon engages the stop pin 100. The prior adjustment for the edge knife is obtained because of the curvature of the guideway 108.

Referring now to Figs. 1 to 8, the sole is supported upon a work support or table 120 which is mounted upon the upper end of a vertically movable plunger 122 (Fig. 8), guided in a bearing 124 at the left side of the frame 2 of the head of the machine. This work support may be lowered for the insertion and removal of work beneath the knives by depression of a treadle 126 (Figs. 1 and 5) normally held raised by means of a spring 128 and connected to a work support lowering mechanism by a rod 130. The mechanism for lowering the work support may be and preferably is similar in all respects to that shown in the United States patent to W. C. Meyer, No. 984,773, dated February 21, 1911, and need not be further referred to herein.

In order to feed the work without injuring the stock, by forcing into it feeding teeth or prongs, as is usual, it has been found convenient to utilize the presser gages 72 and 78 as feeding feet to impart a step-by-step feed.

Referring now to Figs. 1, 3, 4 and 7 to 9, the carrier 34, which sustains the channel and edge knife presser gages, is mounted upon a pair of cone bearings 132 (Fig. 8) journaled in and extending transversely of the frame 2 of the head of the machine. Such a mounting permits an oscillatory movement of the carrier 34 across the work table 120. The carrier 34 is oscillated about its bearing 132 from an actuator on the main shaft 30 which may conveniently be in the form of a cam groove 134 (Fig. 9) in a cam disk 136 mounted on said shaft. This form of actuator insures a positive and constant throw in both directions. The connections between the carrier 34 and the cam groove 134 may conveniently consist of a roll 137, adapted to travel in the cam groove, carried upon the end of a crank 138 having a bearing on a stud 140 (Figs. 3, 4 and 9) journaled in a bracket 142 of the frame 2. The crank 138 is connected by a tie piece 143 to a second crank 144, and connection between the crank 144 and the carrier 34 may be made by means of a connecting link 148 (Figs. 3 and 7). With this construction a rotation of the cam disk 136 will impart an oscillatory motion, of constant amplitude, to the carrier 34 about its bearing 132.

A great desideratum in this class of machines is to provide a high rate of speed of work feed so that the greatest number of soles can be treated in the shortest space of time. It has been found, however, that although a high rate of speed of work feed can be readily used along the shank and the forepart of the sole where the edge is comparatively straight, it is exceedingly difficult to guide the sole as it is being cut around the toe while such a high rate of speed is maintained as is possible to use along the portions of the sole just mentioned. It is therefore desirable that means be provided for varying the speed of work feed, and especially to slow it down at the toe as the short curve at this portion of the sole is being cut. This has been conveniently provided for in the present machine by making a slot 150 (Fig. 3) in the crank 144 to which one end of the connecting link 148 is attached and forming the connection between the link 148 and the crank 144 by pivoting the link to a block 152 adapted to slide in the slot 150. The slot is of such length that the block 152 may be placed in alinement with the stud 140 and the pivotal connection of the link 148 with the carrier 34. The slot 150 is formed on an arc of a circle which has the pivotal connection of the link 148 with the carrier 34 as a center at the time when the crank arm 144 is in its position farther to the right in Fig. 3, and therefore when the carrier 34 is at the beginning of its feeding stroke. With this construction it is obvious that the greatest throw or length of feeding step will be imparted to the carrier 34 when the block 152 is at the upper end of the slot, while if the block is in the lower end of the slot, the throw from the cam groove 134 will be substantially nullified and there will be practically no oscillatory movement imparted to the carrier 34, and consequently no feed of the work.

The movement of the block 152 in the slot 150 to vary the speed of the work feed is preferably under control of the operator. A short link 154 (Fig. 3) is attached by its lower end to the pivot pin on which the block 152 is mounted, and by its upper end to the free end of a crank arm 156 which is pinned to a rock shaft 158 (Fig. 9) journaled in a bracket 160 extending from the frame 2 of the head. The crank 156 is tied to a second crank 162, also pinned to the rock shaft 158, and to the free end of this crank is connected a rod 164 (Figs. 1 and 3) which extends downwardly to a lever 166 (Fig. 5) pivotally mounted on the stud 20 carried by the auxiliary frame 5. The lever 166 extends from the left side of the machine and is provided with a foot treadle 168. Between the rod 164 and the lever 166 there is provided a coiled spring 170 for a purpose to be hereinafter made clear. The treadle 168 is normally maintained in its raised position and the block 152, therefore, maintained in the upper end of the slot 150 by means of a coiled spring 172 (Figs. 3 and 7) suitably connected to the crank arm 156 and a pin on the frame 2. With this construction the operator is enabled, by depressing the treadle 168, to draw the block 152 downwardly in its slot 150, and thus slow down the speed of work feed as may be desirable during the cutting operation. Upon relieving the pressure upon the treadle 168 the spring 172 immediately draws the block 152 upwardly again to restore the higher rate of speed. A different range of speed of work feed is desirable for different classes of work, and therefore means is provided for predetermining both the fastest and slowest speed at which the carrier 34 may be oscillated by a controlling movement of treadle lever 166. This is conveniently provided for by mounting on the frame 2 a bracket 174 (Figs. 7 and 9) which carries a pair of adjustable stops 176 and 178 and the crank arm 162 is provided with a lug or projection 180 adapted to engage with said stops and thus limit the vertical movement which can be imparted to the crank arm 162 and through it to the block 152. Adjustment of the stop 176 will predetermine the normal speed of work feed, as the spring 172 will normally maintain the lug 180 of the crank arm 162 in contact with this stop, thus controlling the upper position of the block 152. Adjustment of the stop 178, on the other hand, will predetermine the position to which the block 152 may be lowered against the force of the spring 172 in slowing down the feed.

As heretofore stated, it is convenient to utilize the presser gages 72 and 78 as feet for feeding the work. These gages are maintained constantly in contact with the work, with sufficient force to effect the feed, through the force of the coil springs 52 and 54 bearing downwardly upon the knife carrying slides 36 and 38. In order that the presser gages may obtain a good gripping pressure or bite upon the face of the sole, during the forward or feeding stroke of the carrier 34, their engaging faces are preferably backed off, or beveled, toward their rear edges as shown at 182 in Fig. 15. With this construction a positive work feed is obtained which, however, does not mar the appearance of the face of the sole or injure in any way the strength of the between substance.

As the downward pressure on the presser gages or feeding feet 72 and 78 is constant, it is obvious that some means should be provided for holding the work against movement upon the backward stroke of the carrier 34, otherwise the frictional contact between the presser gages and the sole would carry it backward somewhat. To this end there is provided a work retainer conveniently comprising a slide 184 (Figs. 3, 4 and 9) mounted in ways 186 in the frame 2 for vertical movement. The slide 184 is provided with two bearings 188 in which is mounted a rod 190 (Figs. 3 and 12). The rod 190 is provided with lock nuts 192 supporting a coiled take-up spring 194 which surrounds the rod and bears at its upper end against the lower surface of the upper bearing 188. The upper end of the rod 190 is provided with lock nuts 196. The lower end of the rod 190 is provided with a bearing foot 198 for engaging the work. The slide 184 is actuated vertically to move the bearing foot 198 toward and from the work by means of an eccentric connection with the main shaft 30. This connection comprises a friction block 200 (Fig. 9) on a crank pin 202 extending from the end of the shaft and working in a horizontal slot 204 in the slide 184. The tension of the spring 194 may be adjusted by means of lock nuts 192 while the path of movement of the bearing foot 198 may be varied by an adjustment of the nuts 196. The cam 134 is so designed and the timing of the parts is such that the work retainer foot 198 is raised from the work on the forward stroke of the carrier 34 and is lowered into engagement with the work to hold it firmly on the work support 120 during the backward stroke of the carrier 34. The bearing foot 198 is provided with a toe 206 (Figs. 10 and 13) which projects forwardly between the two presser gages 72 and 78 and bears on the between substance just back of the edge and channel knives and substantially in the vertical plane of their cutting edges at the completion of the cutting stroke, as in Fig. 13. The advantage of this construction will hereinafter be made clear. The bearing foot 198 is preferably adjustably mounted on the end of the rod 190 for movement toward and from the channel and edge knives, so that its toe may be maintained in position between the presser gages whatever the adjustment of the knives. The foot 198 is held in its adjusted position by means of a screw 208 (Fig. 12).

The manner in which the sole is cut will now be clear. On the forward stroke of the carrier 34 the work retainer foot 198 is raised and the sole is fed forward across the work table by the pressure exerted by the presser gages 72 and 78. On the backward stroke of the carrier 34 the work is held from movement by the work retainer which has been moved downwardly into engagement with the sole, and the knives and presser gages are moved backwardly toward it relative to the then stationary sole. It is during this portion of the oscillation of the carrier that the knives perform their work. Thus the sole is fed by a step-by-step movement with the knives always cutting on the backward stroke they being inactive and moving with the work on the forward or feeding stroke.

Referring now to Figs. 2, 3, and 6 to 8, the machine is provided with the usual edge gage 210 which, as usual, projects over the work table 120 and is mounted on a slide 212 (Figs. 6, 7 and 8) for movement in and out, or transversely of the line of work feed, by means of a handle 214 suitably connected to a lever 216 pivoted on the frame 2, and in turn operatively connected to the slide 212, all as fully set forth in the patent to W. C. Meyer, No. 984,773 heretofore referred to. With the type of work feed herein described, the necessary turning or swinging of the sole must occur at a time when the work retainer is removed from engagement with the sole, that is, during the feeding stroke and while the knives are moving forward. As this turning takes place about the channel knife as a center it is desirable that the edge gage 210 be mounted for movement with said knife so as to maintain a constant relation thereto while acting as a bearing for the sole during the turning movement. To this end the edge gage is mounted upon an auxiliary slide 218 (Figs. 6, 7 and 8) mounted in ways 220 in the in-and-out slide 212. The slide 218 is provided with a pin 222 on which is loosely journaled the hub of a vertically arranged pin 224 which projects into a socket in the carrier 34. Such a connection permits an in-and-out movement of the edge gage 210 relative to the knives and to the pin 224, but insures a movement of the edge gage with the knives during the oscillations of the carrier 34.

It is desirable to chamfer or bevel the unchanneled surface of the sole for a purpose well known to those skilled in the art, and therefore the present machine has been provided with the chamfer knife 228 (Figs. 2, 6 and 8) which is held in a chamfer knife block 230 by means of a collar screw 232 (Figs. 3 and 6), and said chamfer knife block is held for in-and-out adjustment on the auxiliary slide 218 by means of a second collar screw 234. The chamfer knife 228 projects upwardly beyond the surface of the table 120 at an angle of about 45°, and is arranged to bear against the edge of the table (see Fig. 14). It is located at the forward side, and in line with the face of the edge gage (Fig. 6), its cutting edge being preferably somewhat in advance of the edge knife, considering their relative positions when making the cut. This insures a chamfer cut which at no time runs out of the sole, if the edge of the sole is kept in contact with the edge gage. In the location named, the back of the chamfer knife forms a continuation of the nose of the edge gage and prevents any possibility of swinging the sole so rapidly when working at the toe as to force the sole too far under the edge knife. If this tendency to crowd the sole inward when turning at the toe was not provided against, there would result a varying width of edge cut on the last swing. The chamfer knife, therefore, insures a normal cut as the toe of the sole is turned on the edge gage during the feeding of the work.

It is desirable that means be provided to permit a variation of the normal width of feather which is to be cut, and therefore the edge gage 210 is mounted upon an independently movable slide 236 (Fig. 7) guided in ways upon the auxiliar slide 218 and held in position by a clamp 238 (Figs. 2 and 7) operated by a locking screw 240. When the edge gage 210 is thus adjusted, the chamfer knife 228 is also adjusted, to provide for the desired amount of bevel, by releasing the clamping screw 234 and again bringing the chamfer knife up to its working position at the engaging face of the edge gage. It is obvious that if the edge gage be moved inward for a greater width of feather and the chamfer knife be adjusted to follow its movement that the chamber knife will be moved away from the inner edge of the work table 120, and therefore that when the sole is placed against the edge gage in its inward position of adjustment, the extreme marginal portion of the sole will be unsupported. It is therefore desirable that means be provided to permit also an in-and-out movement of the work support or table 120 to accommodate the varying adjustments of the edge gage and provide a support for the margin of the sole, no matter what the in-and-out position of the chamfer knife may be. To this end the work table 120 is mounted upon a guideway 242 (Fig. 8) sustained by the plunger 122, and has projecting to the right, viewing Fig. 1, a bar 244 (Figs. 6 and 7) which is guided in ways on the auxiliary slide 218 and may be held in any position of in-and-out adjustment by means of a collar screw 246.

In treating most of the stock that is employed for soles it is not desirable that the table 120 have a transverse movement with the work as it is fed, and therefore the connection between the bar 244 and the work table is in the form of a tongue-and-groove slide 248 (Fig. 8) which permits an in-and-out adjustment of the table 120 but prevents any movement of said table with the slide 218 as it moves with the carrier 34 during the feed of the work.

In treating soles for turned work, a shoulder knife is substituted for the edge slitting knife 76, and it is desirable that the shoulder knife be removed from cutting position when working around the heel end of the sole although the channel is continuous.

In treating soles for both welt and turned work, when the soles are to be incorporated in the shoes known as "razor toe" shoes, it is desirable to raise the channel knife from working position when the angle of the channel at the toe is reached, and permit the edge knife to continue to either slit or shoulder the edge of the sole and to completely run off the sole at the toe. The sole is then turned to bring it properly into position for the edge knife to again run on and make its cut down the other side of the forepart. As the knife reaches a position opposite the angle of the channel the channel knife is again dropped down into position to complete the cutting of the channel. Means should therefore be provided, in a machine adapted for both turn and welt work, to permit a raising of either the edge or the channel knife while the other knife remains in working position.

A convenient means for attaining this result in the present machine is shown more particularly in Figs. 1 to 5 inclusive. The frame 2 is provided with a rock shaft 250 (Fig. 4) which has pinned thereon a lever 252 (Fig. 1) to the rear end of which is connected the upper end of a rod 254. The lower end of this rod is connected to a lever 256 pivoted upon the stud 20 of the auxiliary frame 5. The lever 256 projects forwardly at the base of the machine and is provided with a treadle 258 (Figs. 1 and 5). The lever 252 is pressed upwardly, thus maintaining the treadle 258 raised, by means of a spring 260 (Fig. 1) surrounding a pin 262 which passes loosely through the lever, the spring having bearings against the lever and a lug 264 extending from the frame 2. The tension of this spring may be adjusted by means of lock nuts on the pin 262. On the other end of the rock shaft 250 are loosely mounted two levers 266 and 268 (Figs. 2 and 4) which are adapted to engage beneath pins 270 and 272 extending respectively from the knife carrying slides 36 and 38. The pins 270 and 272 project through a slot 274 (Fig. 7) in the face plate 64 of the carrier 34. The levers 266 and 268 are provided with projecting pins or lugs 276 and 278 respectively. The rock shaft 250 also has adjustably pinned to it, by means of a set screw 280, an arm or lifter 282 (Figs. 2 and 4) which can be angularly set upon the stud 250 to engage beneath either of the pins 276 or 278. If the lifter 282 is set upon the rock shaft 250 so as to engage the pin 276 of the lever 266, a depression of the treadle 258 to rotate the lifter 282 will cause the lever 266 to be lifted and with it the channel knife carrying slide 36 against the force of its spring 52. If, on the other hand, the lifter 282 be adjusted on the stud 250 so that it will engage with the pin 278 of the lever 268, a depression of the treadle 258 will cause the edge knife carrying slide 38 to be lifted against the force of its spring 54. Thus means is provided for manipulating either of the knives independently of the other according to the class of sole that is being treated. An adjustable stop 284 (Fig. 1) may conveniently be placed on the frame 2 to be engaged by a lug 286 on the lever 252, and thus limit the upward movement imparted to either of the knives.

As stated, in razor toe work it is customary for the edge knife to run completely off the sole and then be run on again. In order that the knife may be run on the sole again conveniently and quickly it has been found desirable to cut away the rear edge, or heel, of the edge knife presser gage 78, for example, as shown at 288 in Fig. 15. This permits the edge knife presser gage to very readily slip up over the thickness of the sole, as the edge knife is again run on the work for completing the cutting of the edge.

The running off of the sole at the toe by the edge knife in razor toe work will make clear the reason for having the work retaining foot 198 engage the sole right up to the line of the cutting edges of the knives. With this construction a grip on the sole is insured at all times, even when making the last cuts in running off at the toe. Similarly the edge of the work is firmly held when making the first cuts in running on the sole again.

In treating soles for welt work it is desirable to stop the cutting of the knives at a point about opposite the breast line of the heel, and a convenient way in which this may be done is to raise both the channel and edge knives concurrently from the work at the time that this point in the sole is reached.

Referring now to Figs. 2, 3, 5 and 9, the rock shaft 250 has loosely mounted thereon an arm 290 (Fig. 4) having a pair of lugs 292, each of which may be provided with an adjustable stop screw 294, adapted to engage extensions 296, 297 respectively of the levers 266 and 268. The lever arm 290 is operatively connected in any suitable manner, as by the link 298, the bell crank lever 300, the link 302, and the crank 304, to the mechanism for lowering the work support through depression of the treadle 126. These connections are so arranged that when the work support is lowered to remove the work, the edge and channel knives are concurrently raised by the concurrent operation of the levers 266 and 268 lifting the edge and channel knife carrying slides 36 and 38.

It will be noted in Fig. 5 that the treadle 168 for slowing down the speed of work feed is so formed as to project above and across the lever 125 pivoted at 127 in the frame 5 which carries the treadle 126 for depressing the work support and raising the knives from the work. It is most convenient to stop the feed before the withdrawal of the knives from the work. With the arrangement shown in Fig. 5, by pressure on the treadle 168 the speed of work feed is first brought to a minimum, and on further pressure of the foot, the treadle 168 is allowed, by stretching the spring 170 (Fig. 1), to engage and depress the lever 125 which operates the mechanism for lowering the table and lifting the knives. In this manner, although the speed of work feed may be adjusted independently of a lowering of the table or lifting of the knives, nevertheless, all of these operations may be made to take place by a pressure upon a single lever. At the time the knives are lifted they are moved vertically relatively to the work retaining foot 198, which is then raised from the work, and thus this foot acts as a stripping device for removing the sole from the knives as they are raised from their working position.

In Figs. 16 and 17 there has been shown an amplification of the work table. The work table there illustrated has been provided with means to permit a movement in the line of feed of the surface on which the sole rests as it is being fed. This has been found desirable because when the type of work feed herein described is employed with some classes of stock used for soles, the soles are liable to stick upon a stationary table and not be fed the full length of the step of the feed. A circular recess has been formed in the table 120, and in this recess there has been mounted a rotatable disk 306 having a circular bearing 308. A slot 310 is cut in the under side of the table 120 and in this slot is placed a cap or holder 312, adjustably held in place by a set screw 313, for a roll 314 adapted to engage the bearing surface 308. The cap 312 is formed with a beveled surface 316, which is also engaged by the roll 314, forming with the surface 308 a wedge-shaped pocket in which the roll is seated. A spring 318 normally maintains the roll in the small end of the wedge-shaped pocket. The construction described is in effect a "Horton" clutch, and allows the disk 306 to rotate freely in one direction while being restrained from movement in the other. The parts are so arranged that the disk 306 will rotate freely in the direction of work feed while being held from movement on the back stroke of the work feeding device.

In Figs. 18 and 19, there is shown a slight modification of the mechanism for adjusting the speed of the work feed. In this case the link 148 is connected to the carrier 34 in a similar manner as shown in Fig. 3, but the crank arm to which the other end of the link is connected is somewhat differently constructed than in the manner heretofore described. In the modification a crank arm 320 similarly mounted to the crank arm 144 is provided, which is formed with a chamber 322 curved similarly to the curvature of the slot 150, but so located relatively to the stud 140 that the pivot pin of the block 152 may be placed in direct coincidence with the end of the stud. It is obvious that with the construction of the modification the speed of work feed may be completely nullified by drawing downward on the rod 164 to such an extent as to place the pivot pin in the block 152 directly at the end of the stud 140. In this modification also, instead of using the coiled spring 172 for maintaining the block 152 at the upper end of the slot or chamber crank arm, a torsion spring 324 mounted on the rock shaft 158 is utilized, the ends of the spring having bearings against pins 326 and 328 on the bracket 160 and the crank arm 164 respectively. Instead of a separate bracket for the stops utilized for adjusting the range of speed of work feed these stops, in the modification, are shown at 330 and 332 as mounted in the tie piece for connecting the crank arms 156 and 162. The mechanism of the modification operates in a precisely similar manner to that heretofore described for the construction shown in Fig. 3.

The general operation of a machine of this type is well known to those skilled in the art and therefore, the operation of the present machine need not be described in detail, especially as it has been already described to a greater or less extent in connection with the detailed description of the construction of the machine.

To insert the work the table is lowered by depressing the treadle 126 and after a sole has been placed in contact with the edge gage the table is allowed to rise. This causes the sole to engage the edge and channel knives. The friction clutch is thrown in by depressing the treadle 23 and this starts the main shaft 30 and the feeding of the work. The work feeding motion causes the knives to bury themselves in the leather to the extent allowed by the adjustment of the presser gages. The feeding and cutting of the sole takes place as described, the mechanism for varying the speed of work feed being manipulated as may be desired. At the completion of the cutting of one sole the work feed is stopped, the knives are raised, and the sole is stripped therefrom as described, while the work support is lowered to permit ready removal of the sole operated upon and another sole is placed in the machine. All this may occur without removing the foot from the treadle 23, that is, the main shaft 30 may be maintained rotating continuously if it is so desired.

Nothing herein contained is to be construed as limiting this invention in the scope of its application to use in connection with the particular machine or the particular mode of operation, or both, selected for the purpose of illustration and explanation. While the particulars of construction herein set forth are well suited to one form of the invention, it is not to be understood that these particulars are essential, since they may be variously modified within the skill of the artisan without departing from the true scope of the actual invention as defined in the following claims.

What is claimed as new, is:—

1. In a machine for channeling soles, the combination with a lip forming cutter and step-by-step means for feeding the work comprising a feeding foot for engaging the sole face on which the lip is formed and an actuator having a constant throw for imparting movement to the feeding foot, of an adjusting mechanism, operable while the machine is running, for transmitting to the work feeding means more or less of the throw of the actuator, said adjusting mechanism being constructed and arranged to permit a substantial nullification of the throw of the actuator.

2. A power channeling machine, having, in combination, a work table for supporting a flat sole and over which the sole is fed, a lip forming cutter supported opposite said table, a reciprocatory head, a work feeding foot sustained thereby for engaging the sole adjacent the point of operation of said cutter, means for reciprocating said head to feed the sole step by step constructed and arranged to provide a relatively high speed of work feed, and provision for slowing down the speed of work feed a substantial amount during the operation of the machine and while cutting around the toe to facilitate the guiding of the sole by the operator relatively to the cutter.

3. In a machine for channeling soles, the combination with a cutter and means for feeding the work constructed and arranged to normally provide one speed of work feed, of means under control of the operator for varying the normal speed of work feed, and means for automatically reëstablishing the normal speed.

4. In a machine for channeling soles, the combination with a work support, a reciprocatory carrier opposed thereto, a cutter sustained by said carrier and a spring-pressed gage adapted to bear on the work also sustained by said carrier, of automatic means to reciprocate said carrier to feed the work by the pressure of said gage, and means under control of the operator to vary the amplitude of the carrier reciprocation.

5. In a machine for channeling soles, an oscillatory carrier sustaining a presser gage adapted to engage the sole and feed it forward, of means to vary the amplitude of the carrier oscillations comprising a rock shaft having a slotted or chambered crank arm mounted thereon, means to rock said shaft, a link connected at one end to said carrier and at its other in said slot or chamber, and provision for varying the relation of said last named connection to the rock shaft.

6. In a machine for channeling soles, the combination with a work feeding device and operating means therefor, including a slotted or chambered crank arm having a connecting block extending into said slot or chamber from said feeding device, of means for rocking said crank arm, a spring to normally maintain said block in a predetermined position in said slot or chamber, and means for varying said predetermined position whereby the movement of the work feeding device is varied.

7. In a machine for channeling soles, the combination with a work table for supporting a flat sole, means for feeding the work over the table and a cutter, of means for varying the speed of work feed, and provision for preliminarily determining the range of such variation.

8. In a channeling machine, the combination with a work support, a cutter, a work feeding device movable in the line of feed, and a work retaining foot movable toward and from the work, of means to move said cutter and device away from said work retainer while the latter is raised, to feed the work, and toward said work retainer while in work engaging position, to form a cut.

9. In a channeling machine, the combination with a work support at one side of the sole and work feeding, cutting and retaining devices at the other side of the sole, of provision for operating said retaining device to engage the work while it is being cut and to be disengaged therefrom while it is being fed.

10. In a stock fitting machine for channeling soles, the combination with a feather edge forming knife and a channel forming knife, of means to reciprocate said knives and the work together in one direction to feed the work, and means to thereafter clamp the work against movement while said knives move backwardly to form the feather edge and channel.

11. In a channeling machine, the combination with a reciprocating lip forming cutter and operating means therefor, of a sole edge gage and provision for moving said gage with the cutter to facilitate the guiding of the work by the operator.

12. In a channeling machine, the combination with a cutter and operating means for reciprocating said lip forming cutter in the line of feed, of a sole edge gage and means for connecting said gage with said operating means whereby the cutter and gage are moved in unison.

13. In a channeling machine, the combination with an oscillatory carrier and a cutter sustained thereby, of an edge gage mounted for movement in a single plane, and a sliding pin and slot connection between said carrier and gage whereby said gage is permitted to follow the cutter movement.

14. An insole machine, having, in combination, cutting means comprising channeling, feather edging and chamfering knives mounted for concurrent movement in the line of feed, mechanism to move said cutting means and insole in one direction into position to start a cut, and a device to hold the insole against movement while said cutting means move backwardly to form the cut.

15. In a channeling machine, the combination with an edge gage and provisions for moving said gage both transversely of and in the direction of the line of feed, of a work support mounted for transverse movement with said gage, but permitting independent movement of said gage in the line of feed.

16. In a channeling machine, the combination with a work support and a chamfer knife for beveling the unchanneled surface of the sole coöperating therewith, of means to move said knife in and out, and provision for maintaining a constant relation between the edge of said support and knife during the in and out movement to at all times support the edge of the sole being beveled.

17. In a channeling machine, the combination with a work support and a chamfer knife for beveling the unchanneled surface of the sole mounted to project above the work support, of provision for adjusting the knife transversely of the line of feed, and provision for independently adjusting the work support to maintain it against the back of the knife.

18. In a channeling machine, the combination with a work support mounted for in and out movement, of a chamfer knife for beveling the unchanneled surface of the sole also mounted for in and out movement, a slide to which both of said parts are connected, and means to move said slide.

19. In a channeling machine, the combination with an edge knife and a channel knife, of a chamfer knife for beveling the unchanneled surface of the sole, a support for sustaining the sole in working relation to said knives, and means providing a relative in and out movement between said support and chamfer knife, and said edge and channel knives.

20. In a channeling machine, the combination with a work support, an edge gage and a chamfer knife for beveling the unchanneled surface of the sole, of means to move said edge gage and chamfer knife in and out in unison, said work support being mounted and connected to permit a concurrent in and out movement, whereby the work automatically follows the edge gage and chamfer knife in their movement.

21. In a channeling machine, a channel knife block having a channel knife mounted thereon, and provision for adjusting said block angularly relatively to the plane of the sole, to vary the obliquity of the channel cut, and toward and from the edge of the sole in a plane parallel to the face of the sole to adjust for thickness of the between substance.

22. A channeling machine, having, in combination, a lip forming cutter constructed and arranged to reciprocate in the line of feed, a gage for the edge of the sole, and provision for maintaining the gage at all times in an unvarying lateral relation to the cutter.

23. A channeling machine, having, in combination, a work table for supporting a flat sole, a lip forming cutter supported opposite the work table, means for reciprocating said cutter in the line of fed, and a movable sole edge gage adjacent the work table and under control of the cutter reciprocating means, whereby the cutter and gage are moved in unison.

24. In a channeling machine, the combination with edge and channel knives, of means for raising said knives concurrently from working position and for automatically returning them to working position, and a device for stripping the work from the knives as they are raised.

25. In a channeling machine, the combination with edge and channel knives and means for feeding the work to permit a continuous cut to be formed including a work retainer, of means for relatively moving said knives and retainer vertically to remove the knives from cutting position in the work.

26. In a channeling machine, the combination with vertically movable edge and channel knives and a vertically movable work support, of means for lowering the work support, and connected mechanism for concurrently raising both the edge and channel knives.

27. In a channeling machine, the combination with vertically movable and independently mounted edge and channel knives, of a lifter for raising said knives from the work, said lifter being adjustable to permit raising either knife independently of the other, and provision for operating said lifter.

28. In a channeling machine, the combination with a work support, means for feeding the work and a cutter, of provision for concurrently stopping the operation of the work feeding means, and for moving the work support and cutter apart to permit removal of the work.

29. In a channeling machine, the combination with a cutter, means for feeding the work and a work support, of provision for concurrently stopping the feed of the work and lowering the work support to permit removal of the work.

30. In a channeling machine, in combination a cutter, a vertically movable work support, a controlling device therefor, means for feeding the work, and a device for controlling the speed of operation of said work feeding means, said controlling devices being constructed and arranged to permit independent operation and also a combined operation of one from the other.

31. In a channeling machine, the combination with work feeding means comprising a presser foot constructed and arranged to bear constantly upon the work and means to reciprocate said foot in the line of feed, of a work support provided with a sole engaging face constructed and arranged to move with the work in one direction of movement of the foot and to be held from movement in the other direction of movement of the foot.

32. In a channeling machine, the combination with a reciprocating work feeding presser foot and an intermittently operating work retaining device timed to be in retracted position when the work is being fed, of a work support provided with a rotatable sole engaging face constructed and arranged to move with the work as it is being fed.

33. In a channeling machine, the combination with a cutter for the face of the sole, and a work support, of an edge gage, and a chamfer knife at the forward side of said gage, said chamfer knife being so arranged relatively to the edge gage as to insure a normal cut by said sole face cutter as the toe of the sole is turned on said edge gage during the feeding of the work.

34. In a channeling machine, the combination with an edge knife, a channel knife and a separate presser gage at the side of each knife, of work feeding means including a work retainer having a bearing portion constructed and arranged to engage the work at a point between said presser gages, and means to actuate the work retainer to intermittently release the work.

35. In a channeling machine, the combination with a cutter, of work feeding means including a work retainer movable intermittently into and out of engagement with the work having a bearing foot adjustable horizontally toward and from the cutter.

36. In a channeling machine, an edge knife and a presser gage therefor, said presser gage having an engaging surface with a cut-away rear edge or heel to permit a ready reëntering on the work after having run off at the toe.

37. In a channeling machine, work feeding means constructed and arranged to feed the work by a movement in substantially a single plane comprising a feeding foot, means to reciprocate said foot and means to maintain said foot constantly in contact with the work, said foot having its work engaging face beveled off toward its rear edge whereby the foot will dig into the work for a positive feed on the forward stroke and ride over the work on the back stroke.

38. A channeling machine, having, in combination, reciprocatory edge and channel knives constructed and arranged to form a cut on the backward stroke, work feeding means operating during the forward stroke of the knives, a work retainer, movable into and out of work engaging position, for engaging the work at a point substantially in the vertical plane of the cutting edges of said knives at the completion of the cutting stroke, and actuating means for said retainer to cause it to engage the work during the cutting stroke of the knives.

39. A machine for channeling soles, having, in combination, a cutter, means for feeding the work, means for varying the speed of work feed, and provision for preliminarily determining both the fastest and slowest speed to be obtained by the speed varying means.

40. A machine for channeling soles, having, in combination, a cutter, means for feeding the work, means for varying the speed of work feed, and independently adjustable devices for preliminarily determining the upper and lower limits of the speed variation.

In testimony whereof I affix my signature, in presence of two witnesses.

FREDERIC E. BERTRAND.

Witnesses:
ANNIE C. RICHARDSON,
WARREN G. OGDEN.

---

Corrections in Letters Patent No. 1,023,801.

It is hereby certified that in Letters Patent No. 1,023,801, granted April 28, 1912, upon the application of Frederic E. Bertrand, of Swampscott, Massachusetts, for an improvement in "Sole-Channeling Machines," errors appear in the printed specification requiring correction as follows: Page 4, line 45, for the word "of" read *in;* page 6, line 128, for the word "auxiliar" read *auxiliary;* page 7, line 10, for the word "chamber" read *chamfer;* page 10, line 51, before the word "cutter" insert the words *lip forming;* same page, line 52, strike out the words "lip forming;" page 11, line 18, for the word "fed" read *feed;* and that the said Letters Patent should be read with these corrections therein that the same may conform to the record of the case in the Patent Office.

Signed and sealed this 21st day of May, A. D., 1912.

[SEAL.]

C. C. BILLINGS,
*Acting Commissioner of Patents.* with the work, said foot having its work engaging face beveled off toward its rear edge whereby the foot will dig into the work for a positive feed on the forward stroke and ride over the work on the back stroke.

38. A channeling machine, having, in combination, reciprocatory edge and channel knives constructed and arranged to form a cut on the backward stroke, work feeding means operating during the forward stroke of the knives, a work retainer, movable into and out of work engaging position, for engaging the work at a point substantially in the vertical plane of the cutting edges of said knives at the completion of the cutting stroke, and actuating means for said retainer to cause it to engage the work during the cutting stroke of the knives.

39. A machine for channeling soles, having, in combination, a cutter, means for feeding the work, means for varying the speed of work feed, and provision for preliminarily determining both the fastest and slowest speed to be obtained by the speed varying means.

40. A machine for channeling soles, having, in combination, a cutter, means for feeding the work, means for varying the speed of work feed, and independently adjustable devices for preliminarily determining the upper and lower limits of the speed variation.

In testimony whereof I affix my signature, in presence of two witnesses.

FREDERIC E. BERTRAND.

Witnesses:
ANNIE C. RICHARDSON,
WARREN G. OGDEN.

---

Corrections in Letters Patent No. 1,023,801.

It is hereby certified that in Letters Patent No. 1,023,801, granted April 28, 1912, upon the application of Frederic E. Bertrand, of Swampscott, Massachusetts, for an improvement in "Sole-Channeling Machines," errors appear in the printed specification requiring correction as follows: Page 4, line 45, for the word "of" read *in;* page 6, line 128, for the word "auxiliar" read *auxiliary;* page 7, line 10, for the word "chamber" read *chamfer;* page 10, line 51, before the word "cutter" insert the words *lip forming;* same page, line 52, strike out the words "lip forming;" page 11, line 18, for the word "fed" read *feed;* and that the said Letters Patent should be read with these corrections therein that the same may conform to the record of the case in the Patent Office.

Signed and sealed this 21st day of May, A. D., 1912.

[SEAL.]

C. C. BILLINGS,
*Acting Commissioner of Patents.*

It is hereby certified that in Letters Patent No. 1,023,801, granted April 23, 1912, upon the application of Frederic E. Bertrand, of Swampscott, Massachusetts, for an improvement in "Sole-Channeling Machines," errors appear in the printed specification requiring correction as follows: Page 4, line 45, for the word "of" read *in;* page 6, line 128, for the word "auxiliar" read *auxiliary;* page 7, line 10, for the word "chamber" read *chamfer;* page 10, line 51, before the word "cutter" insert the words *lip forming;* same page, line 52, strike out the words "lip forming;" page 11, line 18, for the word "fed" read *feed;* and that the said Letters Patent should be read with these corrections therein that the same may conform to the record of the case in the Patent Office.

Signed and sealed this 21st day of May, A. D., 1912.

[SEAL.]

C. C. BILLINGS,
*Acting Commissioner of Patents.*